United States Patent
Okada et al.

(10) Patent No.: US 10,110,459 B2
(45) Date of Patent: Oct. 23, 2018

(54) THROUGHPUT MEASURING METHOD, COMPUTER READABLE MEDIUM, AND APPARATUS

(71) Applicant: FUJITSU LIMITED, Kawasaki-shi, Kanagawa (JP)

(72) Inventors: Sumiyo Okada, Kawasaki (JP); Yuji Nomura, Kawasaki (JP); Fumiyuki Iizuka, Kawasaki (JP); Naoyoshi Ohkawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 15/054,898

(22) Filed: Feb. 26, 2016

(65) Prior Publication Data
US 2016/0261479 A1 Sep. 8, 2016

(30) Foreign Application Priority Data
Mar. 6, 2015 (JP) ................................. 2015-044965

(51) Int. Cl.
*H04L 12/26* (2006.01)

(52) U.S. Cl.
CPC ...... *H04L 43/0888* (2013.01); *H04L 43/0864* (2013.01); *H04L 43/16* (2013.01)

(58) Field of Classification Search
CPC .. H04L 43/0888; H04L 43/0864; H04L 43/16
See application file for complete search history.

(56) References Cited

U.S. PATENT DOCUMENTS

| 6,757,255 | B1 | 6/2004 | Aoki et al. |
| 2003/0031185 | A1* | 2/2003 | Kikuchi .............. H04L 43/0852 370/400 |
| 2004/0001691 | A1* | 1/2004 | Li .......................... H04L 47/10 386/213 |
| 2006/0218264 | A1 | 9/2006 | Ogawa et al. |
| 2007/0115846 | A1* | 5/2007 | Kooyers ............. H04L 43/0847 370/252 |

(Continued)

FOREIGN PATENT DOCUMENTS

| JP | 2000-106557 | 4/2000 |
| JP | 2003-209574 | 7/2003 |

(Continued)

*Primary Examiner* — Jenee Holland
(74) *Attorney, Agent, or Firm* — Staas & Halsey LLP

(57) ABSTRACT

A throughput measuring method includes: acquiring a plurality of data packets at an observation point on a network, the plurality of data packets being transmitted from a transmission source apparatus and received by a transmission destination apparatus; calculating a plurality of round trip times, for each of the data packets, from a time point of acquisition of each of the data packets transmitted from the transmission source apparatus to a time point of acquisition of response packet corresponding to each of the data packets; identifying a measurement time section including the plurality of calculated round trip times increasing in ascending order of identification numbers of the response packets; and calculating a throughput of the identified measurement time section based on data quantities of the plurality of data packets transmitted from the transmission source apparatus during the identified measurement time section.

17 Claims, 19 Drawing Sheets

(56) References Cited

U.S. PATENT DOCUMENTS

| | | | | |
|---|---|---|---|---|
| 2010/0122135 A1* | 5/2010 | Lida | ............. | H04L 1/007 |
| | | | | 714/748 |
| 2013/0028096 A1* | 1/2013 | Cheng | ............. | H04L 1/1825 |
| | | | | 370/241 |
| 2013/0227141 A1* | 8/2013 | Schmidt | ............. | H04L 29/12066 |
| | | | | 709/225 |
| 2014/0321274 A1* | 10/2014 | Gahm | ............. | H04L 47/326 |
| | | | | 370/231 |
| 2014/0341023 A1* | 11/2014 | Kim | ............. | H04W 28/0278 |
| | | | | 370/230.1 |
| 2015/0271042 A1 | 9/2015 | Thapliya et al. | | |

FOREIGN PATENT DOCUMENTS

| | | |
|---|---|---|
| JP | 2004-32377 | 1/2004 |
| JP | 2006-279283 | 10/2006 |
| JP | 2007-201702 | 8/2007 |
| JP | 2009-296304 | 12/2009 |
| JP | 2010-233272 | 10/2010 |
| JP | 2013-34048 | 2/2013 |
| JP | 2014-116840 | 6/2014 |
| JP | 2014-165809 | 9/2014 |

* cited by examiner

FIG. 6

| DESTINATION ADDRESS (6 BYTES) | TRANSMISSION SOURCE ADDRESS (6) | TYPE (2) |

FIG. 9

| RECEPTION TIME | TRANSMISSION SOURCE IP ADDRESS | TRANSMISSION SOURCE PORT NUMBER | DESTINATION IP ADDRESS | DESTINATION PORT NUMBER | SIZE | SEQUENCE NUMBER | ACK NUMBER |
|---|---|---|---|---|---|---|---|
| 2015-02-17 17:42:22.065882 | IP ADDRESS A | PORT NUMBER A | IP ADDRESS B | PORT NUMBER B | 500 | 1001 | - |
| 2015-02-17 17:42:22.089849 | IP ADDRESS A | PORT NUMBER A | IP ADDRESS B | PORT NUMBER B | 500 | 1501 | - |
| ... | ... | ... | ... | ... | ... | ... | ... |
| 2015-02-17 17:42:22.146981 | IP ADDRESS B | PORT NUMBER B | IP ADDRESS A | PORT NUMBER A | - | - | 1501 |
| 2015-02-17 17:42:22.169871 | IP ADDRESS B | PORT NUMBER B | IP ADDRESS A | PORT NUMBER A | - | - | 2001 |
| ... | ... | ... | ... | ... | ... | ... | ... |

FIG. 11

| THROUGHPUT [Kbps] | |
|---|---|
| UPLINK | DOWNLINK |
| 1,025 | 1,895 |
| 1,028 | 5,266 |
| 1,037 | 6,564 |
| 1,051 | 2,830 |
| 1,053 | 5,705 |
| 1,057 | 3,909 |
| 1,062 | 2,192 |
| 1,066 | 3,113 |
| 1,067 | 5,286 |
| 1,070 | 2,101 |
| 1,083 | 4,577 |
| 1,085 | 6,560 |
| 1,095 | 6,055 |
| 1,096 | 6,148 |
| 1,096 | 2,801 |
| 1,101 | 1,263 |
| 1,106 | 2,678 |
| 1,107 | 1,917 |
| 1,108 | 4,060 |
| 1,120 | 6,644 |
| 1,135 | 6,432 |
| 1,144 | 2,454 |
| 1,155 | 2,467 |
| 1,171 | 2,828 |
| 1,174 | 1,108 |
| 1,183 | 4,954 |

FIG. 15
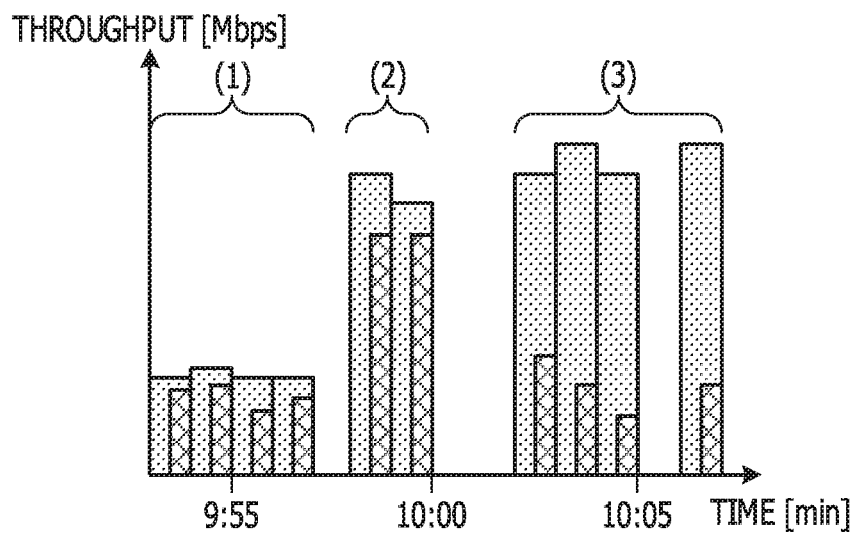
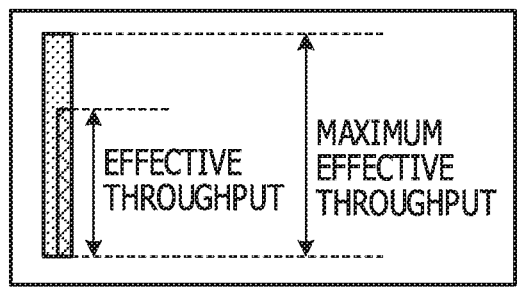

THROUGHPUT MEASURING METHOD, COMPUTER READABLE MEDIUM, AND APPARATUS

CROSS-REFERENCE TO RELATED APPLICATION

This application is based upon and claims the benefit of priority of the prior Japanese Patent Application No. 2015-044965, filed on Mar. 6, 2015, the entire contents of which are incorporated herein by reference.

FIELD

The embodiments discussed herein are related to a throughput measuring method, a recording medium, and an apparatus.

BACKGROUND

In communication between terminals, between a server and a terminal, or the like, communication speed is affected by the state of a terminal, the state of a server, a bandwidth shortage of a network, and the states of the devices through which communication is made. Throughput is used as an indicator indicating a communication speed.

FIG. 18 is a diagram for explaining throughput. As illustrated in FIG. 18, there are two kinds of throughput, that is to say, effective throughput and maximum effective throughput. The effective throughput is a processing capacity (the amount of data transfer) per unit time, which was actually able to be used. On the other hand, the maximum effective throughput is throughput of when a free bandwidth excluding traffic of the other terminals has been used up in a bottleneck section.

In FIG. 18, if it is assumed that the throughput of when the transmission path is fully occupied is 100 Mbps (100 megabits per second), and the other terminals are using a bandwidth for 50 Mbps, the maximum effective throughput is 50 Mbps. On the other hand, the measurable effective throughput is less than the maximum effective throughput and is 30 Mbps, for example. Whether or not the free bandwidth of a network is fully used is determined by the maximum effective throughput.

In this regard, a related-art technique for achieving data transmission based on a reliable and efficient rate setting is provided. In this technique, rate control is performed with maximum throughput calculated based on a data transmission-and-reception period excluding a data transmission-and-reception non-execution period having no contribution to data transmission and reception as the upper limit.

Also, a related-art technique for using radio resources efficiently and improving system throughput is provided. In the technique, a NACK is discarded if a time interval obtained based on a NACK reception time and a transmission time of data re-transmitted immediately before the NACK reception is less than the round trip time (RTT).

As a related-art example, Japanese Laid-open Patent Publication Nos. 2006-279283 and 2013-34048 are known.

Whether or not a delay in communication is caused by a bandwidth shortage of a network is determined by the fact of whether or not a free bandwidth of the network is fully used. However, throughput that is able to be measured currently is effective throughput. The bandwidth used by the other terminals is not fixed, and thus there is a problem in that it is difficult to measure the maximum effective throughput used for determining whether or not the free bandwidth of the network is fully used.

SUMMARY

According to an aspect of the invention, a throughput measuring method includes: acquiring a plurality of data packets at an observation point on a network, the plurality of data packets being transmitted from a transmission source apparatus and received by a transmission destination apparatus; calculating a plurality of round trip times, for each of the data packets, from a time point of acquisition of each of the data packets transmitted from the transmission source apparatus to a time point of acquisition of response packet corresponding to each of the data packets; identifying a measurement time section including the plurality of calculated round trip times increasing in ascending order of identification numbers of the response packets; and calculating a throughput of the identified measurement time section based on data quantities of the plurality of data packets transmitted from the transmission source apparatus during the identified measurement time section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an Ethernet (registered trademark, hereinafter the same) header;

FIG. 9 is a diagram illustrating an example of a storage unit;

FIG. 11 is a diagram illustrating display example#1;

FIG. 15 is a diagram illustrating display example#5;

DESCRIPTION OF EMBODIMENTS

According to one aspect of the embodiments, it is desirable to calculate the maximum effective throughput. Following, a detailed description will be given of an embodiment of a throughput measuring program, a throughput measuring method and a throughput measuring apparatus that are disclosed in the application concerned with reference to the drawings. In this regard, the disclosed technique is not limited by the embodiments.

EMBODIMENT

Figure 1A:
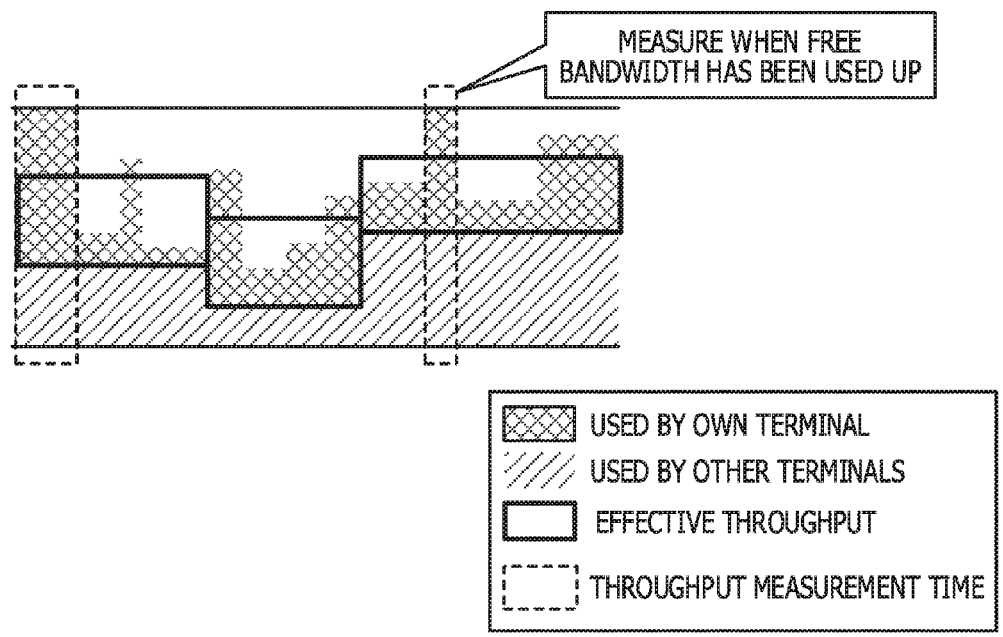
FIG. 1A is a first diagram for explaining measurement of maximum effective throughput.
Figure 1B:
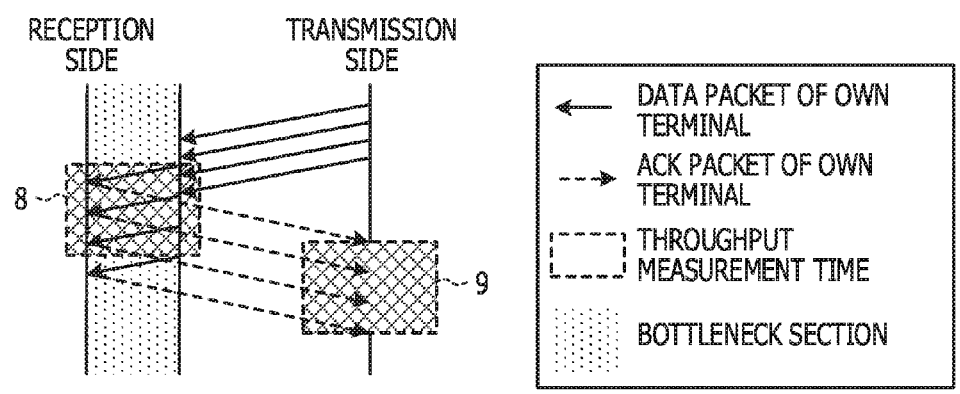
FIG. 1B is a second diagram for explaining measurement of maximum effective throughput.

First, a description will be given of measurement of the maximum effective throughput. FIG. 1A and FIG. 1B are diagrams for explaining measurement of the maximum effective throughput. FIG. 1A is an image chart of a transmission path, and FIG. 1B is a ladder diagram illustrating a flow of packets.

As illustrated in FIG. 1A, values obtained as effective throughput, illustrated by bold frames, are the average values of the throughputs that vary. The maximum effective throughput is obtained by measuring throughput when a free bandwidth excluding traffic of the other terminals has been used up. Accordingly, it is possible to measure the maximum effective throughput by identifying a time section in a state in which a free bandwidth excluding traffic of the other terminals has been used up, and measuring throughput in the identified time section.

In a time section, which is a bottleneck section, in a state in which a free bandwidth excluding traffic of the other terminals has been used up, as illustrated in FIG. 1B, waiting for transmitting packets occurs, and thus a time period from transmission of a packet to reception increases for each packet. Accordingly, it is possible to measure the maximum effective throughput by measuring a throughput in a time section 8 in which a time period taken from transmission of a packet to reception increases for each packet.

Also, when a reception terminal receives a packet, the reception terminal returns an acknowledgment (ACK). Accordingly, it is also possible to measure the maximum effective throughput by measuring throughput in a time section 9 in which a time period taken from transmission of a packet at the transmission side to reception of its ACK increases for each packet.

Figure 2:
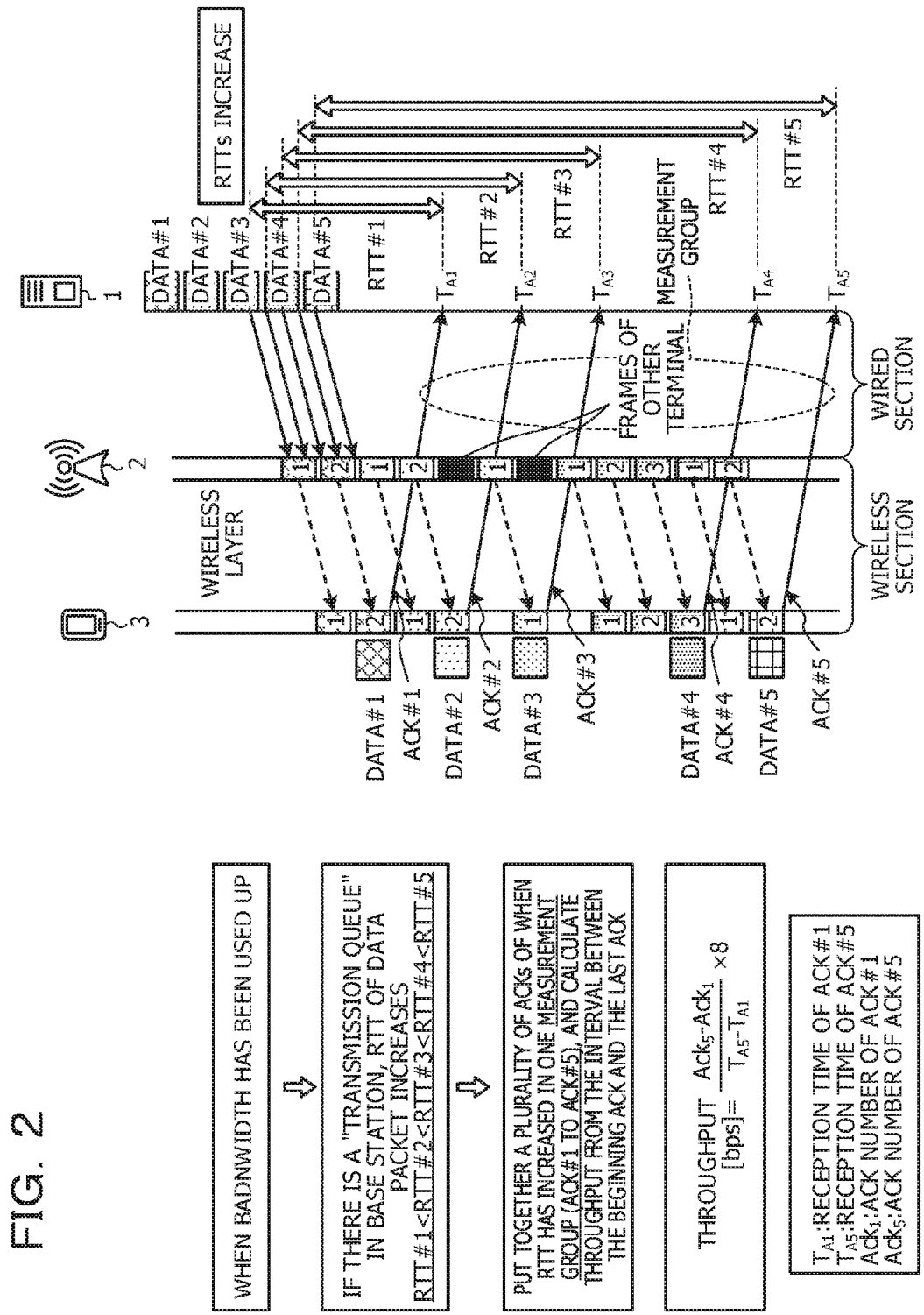
FIG. 2 is a diagram for explaining a measuring method by a throughput measuring apparatus according to an embodiment.

Thus, the throughput measuring apparatus according to the embodiment measures throughput in a time section in which a time period taken from transmission of a packet at the transmission side to reception of its ACK increases for each packet. FIG. 2 is a diagram for explaining a measuring method by the throughput measuring apparatus according to the embodiment. In FIG. 2, a server 1 transmits DATA packets denoted by DATA#1 to DATA#5 to a terminal 3 via a base station 2. The server 1 and the base station 2 are wiredly coupled, and the base station 2 and the terminal 3 are wirelessly coupled. Here, it is assumed that the wireless section between the base station 2 and the terminal 3 is a bottleneck section.

When a bandwidth is used up in the bottleneck section, waiting for transmitting packets occurs in the base station 2 because of interruption by the other terminal frames due to an increase in the number of terminals communicating with the base station, or a DATA packet is divided into a plurality of frames due to deterioration in the radio wave condition, or the like.

In FIG. 2, DATA#1, DATA#2, and DATA#5 are individually divided into two frames, and waiting for transmitting packets occur. Also, DATA#4 is divided into three frames, and waiting for transmitting the packets occurs. Also, DATA#3, DATA#4, and DATA#5 are interrupted by frames of the other terminals so that waiting for transmitting the packets occurs.

When the terminal 3 receives DATA#1 to DATA#5, the terminal 3 returns ACKs denoted by ACK#1 to ACK#5, respectively. The server 1 then receives ACK#1 to ACK#5 at time $T_{A1}$ to $T_{A5}$, respectively. Here, if it is assumed that Round Trip Time (RTT)#1 to RTT#5 are time periods from when DATA#1 to DATA#5 are transmitted to the reception of ACK#1 to ACK#5, respectively, there is a relationship in which RTT#1<RTT#2<RTT#3<RTT#4<RTT#5. That is to say, if there is a waiting for transmitting the packets in the base station 2, the RTT increases.

Thus, the throughput measuring apparatus according to the embodiment puts together the ACKs (ACK#1 to ACK#5) of when the RTT has increased as one measurement group, and calculates the maximum effective throughput from the interval (reception time difference) between the beginning ACK and the last ACK. That is to say, the throughput measuring apparatus according to the embodiment calculates the maximum effective throughput from Throughput [bps]=$8 \times (Ack_5 - Ack_1)/(T_{A5} - T_{A1})$. Here, $Ack_5$ is the ACK number of ACK#5, and $Ack_1$ is the ACK number of ACK#1. The difference of the ACK numbers represents the number of bytes of the transmitted data. The reason for this is as follows.

Figure 3A:
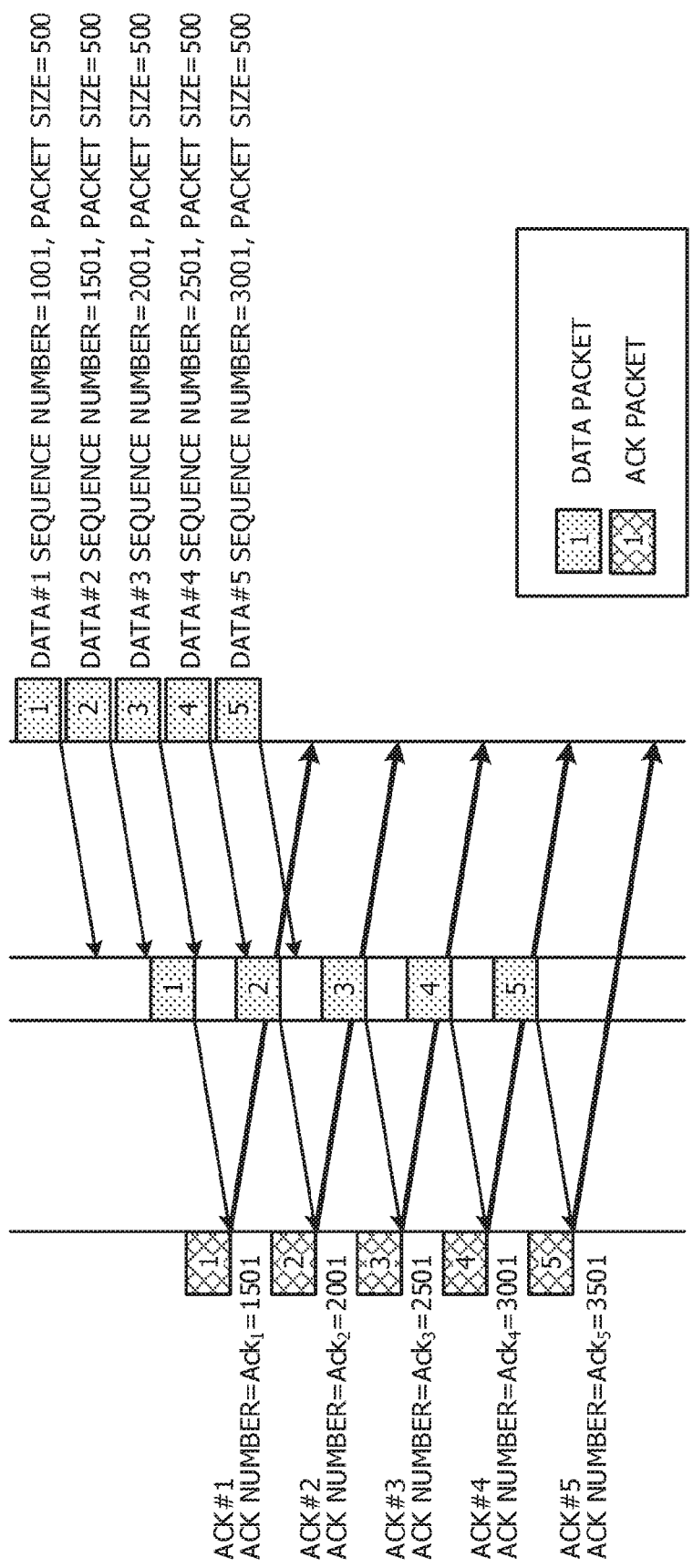
FIG. 3A is a diagram for explaining ACK numbers.
Figure 3B:
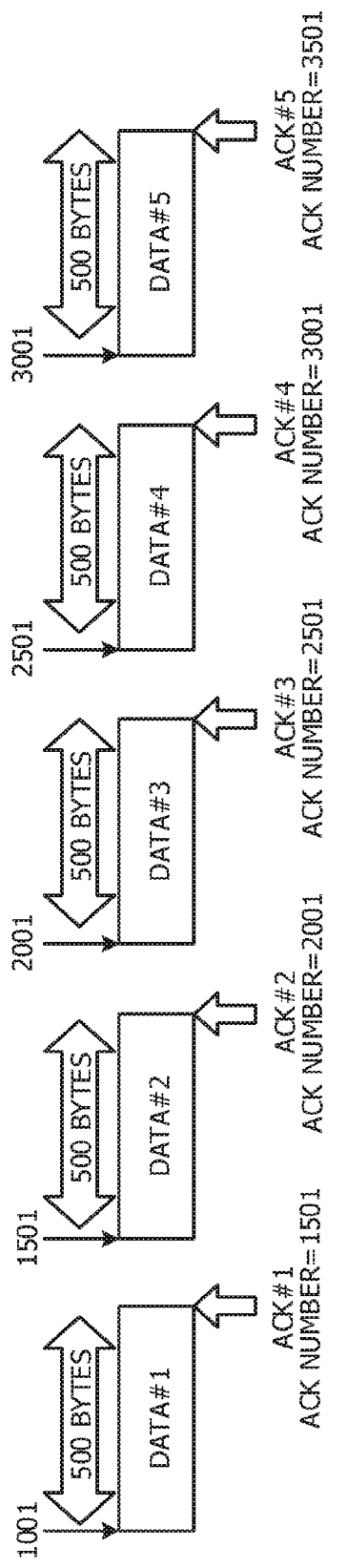
FIG. 3B is a diagram for explaining that the difference of ACK numbers represents the number of bytes.

FIG. 3A is a diagram for explaining ACK numbers. FIG. 3B is a diagram for explaining that the difference of ACK numbers represents the number of bytes. As illustrated in FIG. 3A, if it is assumed that the sequence number of DATA#1 is 1001, and the packet size is 500, the ACK number of ACK#1, $Ack_1$, is 1501. That is to say, the ACK number of Transmission Control Protocol (TCP) is the sequence number of the DATA packet to be sent next, and represents that the reception side has received data up to the sequence number of ACK number−1.

In the same manner, if it is assumed that the sequence number of DATA#2 is 1501, and the packet size is 500, the ACK number of ACK#2, $Ack_2$, is 2001. If it is assumed that the sequence number of DATA#3 is 2001, and the packet size is 500, the ACK number of ACK#3, $Ack_3$, is 2501. If it is assumed that the sequence number of DATA#4 is 2501, and the packet size is 500, the ACK number of ACK#4, $Ack_4$, is 3001. If it is assumed that the sequence number of DATA#5 is 3001, and the packet size is 500, the ACK number of ACK#5, $Ack_5$, is 3501.

Accordingly, as illustrated in FIG. 3B, while the transmission side receives ACK#1 to ACK#2, the reception side receives 500 bytes of DATA#2 ($Ack_2 - Ack_1 = 2001 - 1501 = 500$). While the transmission side receives ACK#2 to ACK#3, the reception side receives 500 bytes of DATA#3 ($Ack_3 - Ack_2 = 2501 - 2001 = 500$). While the transmission side receives ACK#3 to ACK#4, the reception side receives 500 bytes of DATA#4 ($Ack_4 - Ack_3 = 3001 - 2501 = 500$). While the transmission side receives ACK#4 to ACK#5, the reception side receives 500 bytes of DATA#5 ($Ack_5 - Ack_4 = 3501 - 3001 = 500$).

To summarize these, while the transmission side receives ACK#1 to ACK#5, the reception side receives DATA#2 to DATA#5, and thus the ACK number of ACK#5−the ACK number of ACK#1=Ack$_5$−Ack$_1$=the total size of data from DATA#2 to DATA#5. Accordingly, the difference of ACK numbers represents the number of bytes of the transmitted data.

Figure 4:
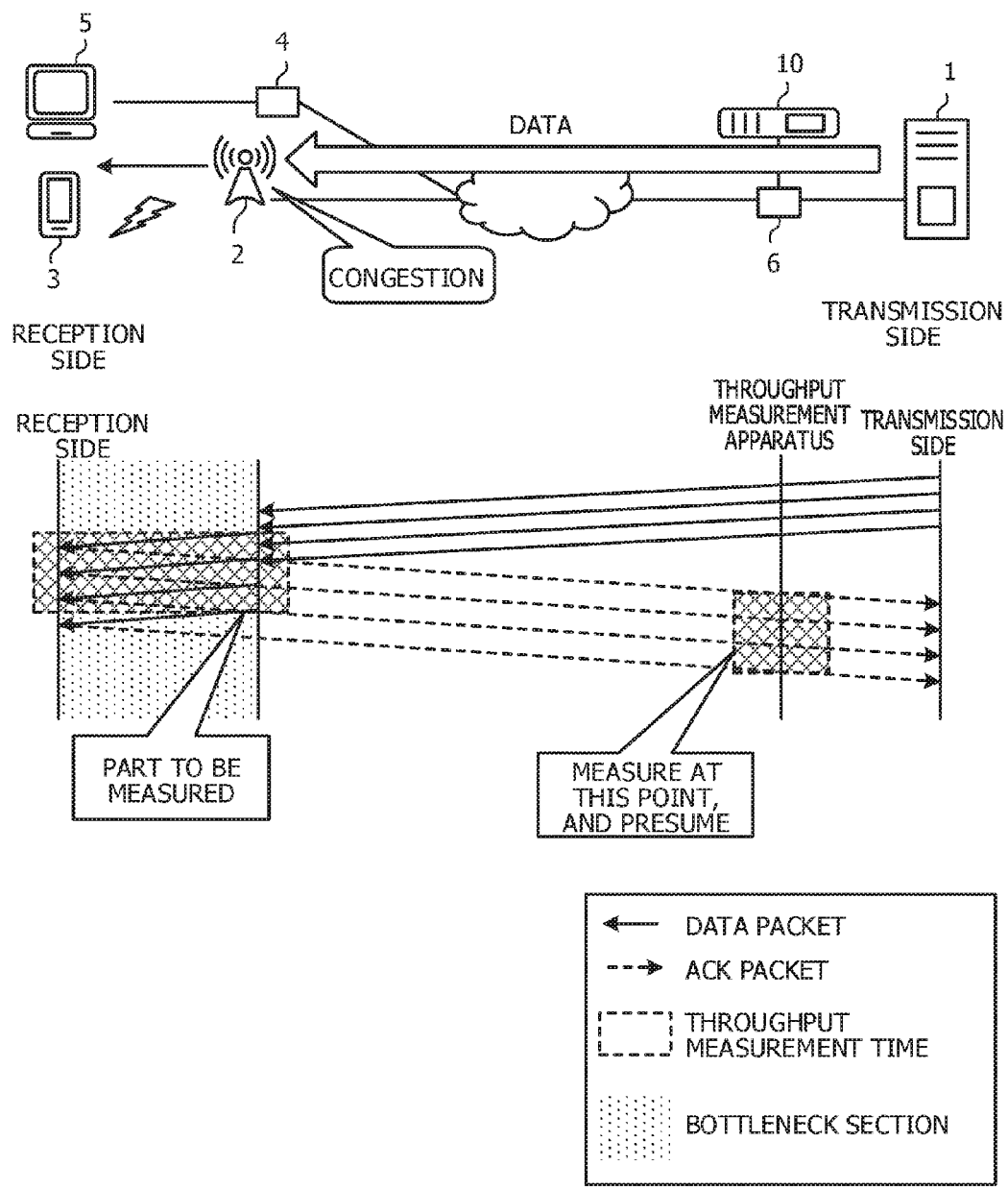
FIG. 4 is a diagram illustrating a position at which the throughput measuring apparatus according to the embodiment is installed.

Next, a description will be given of the throughput measuring apparatus according to the embodiment. FIG. 4 is a diagram illustrating a position at which the throughput measuring apparatus according to the embodiment is installed. As illustrated in FIG. 4, the data transmitted from the server 1 is wirelessly transmitted to the terminal 3, such as a smartphone, or the like via the base station 2. Alternatively, the data transmitted from the server 1 is wiredly transmitted to a terminal 5, such as a personal computer (PC), or the like via a switch 4.

In such communication from the server 1 to the terminal 3, a bottleneck section is sometimes the wireless section between the base station 2 and the terminal 3. At this time, a part at which the maximum effective throughput is to be measured is between the base station 2 and the terminal 3. Also, an ACK packet is transmitted from the terminal 3 to the server 1 via the base station 2.

Thus, in the throughput measurement according to the embodiment, a throughput measuring apparatus 10 is installed in a wired section between the base station 2 and the server 1, and the maximum effective throughput of the bottleneck section is presumed using the reception time of ACK packets. The throughput measuring apparatus 10 causes network signals to branch using a TAP 6 to be taken out. However, the throughput measuring apparatus 10 may receive a signal copied to a mirror port using a switch in place of the TAP 6.

Figure 5:
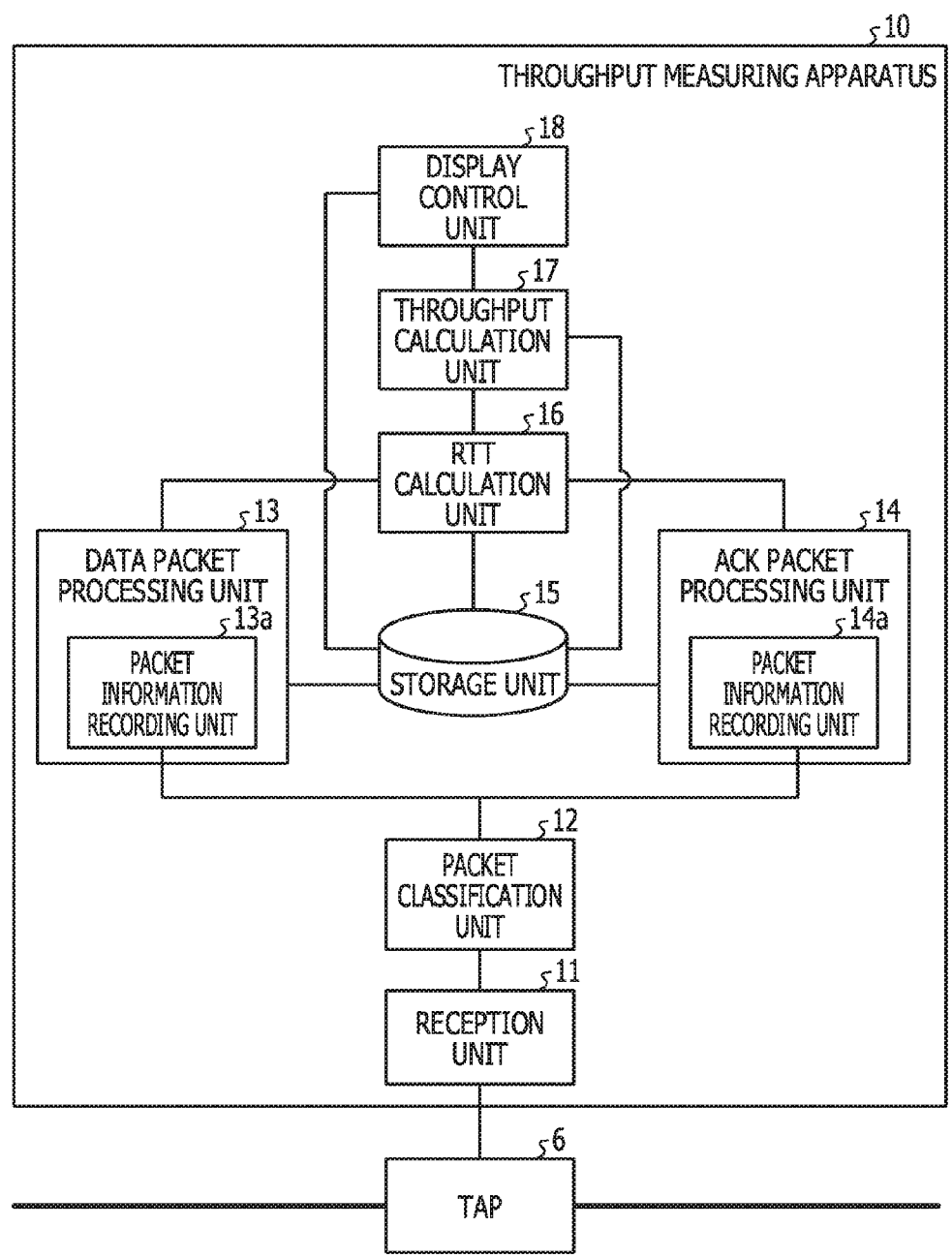
FIG. 5 is a diagram illustrating a functional configuration of the throughput measuring apparatus.

FIG. 5 is a diagram illustrating a functional configuration of the throughput measuring apparatus 10. As illustrated in FIG. 5, the throughput measuring apparatus 10 includes a reception unit 11, a packet classification unit 12, a DATA packet processing unit 13, an ACK packet processing unit 14, a storage unit 15, an RTT calculation unit 16, a throughput calculation unit 17, and a display control unit 18.

The reception unit 11 receives signals that have been branched from the TAP 6 in the wired section between the server 1 and the base station 2 and passes the signals to the packet classification unit 12. The packet classification unit 12 extracts a TCP packet to be analyzed based on the header information of the received signal. The packet classification unit 12 extracts the TCP packet by referring an Ethernet header and an Internet Protocol (IP) header.

FIG. 6 is a diagram illustrating an Ethernet header. As illustrated in FIG. 6, the Ethernet header includes a six-byte destination address, a six-byte transmission source address, and a two-byte type. The destination address is the media access control (MAC) address of a destination, and the transmission source address is the MAC address of a transmission source. The type represents a type of a packet, and if the type is 0x0800, the packet is an IP packet of IPv4.

Figure 7:
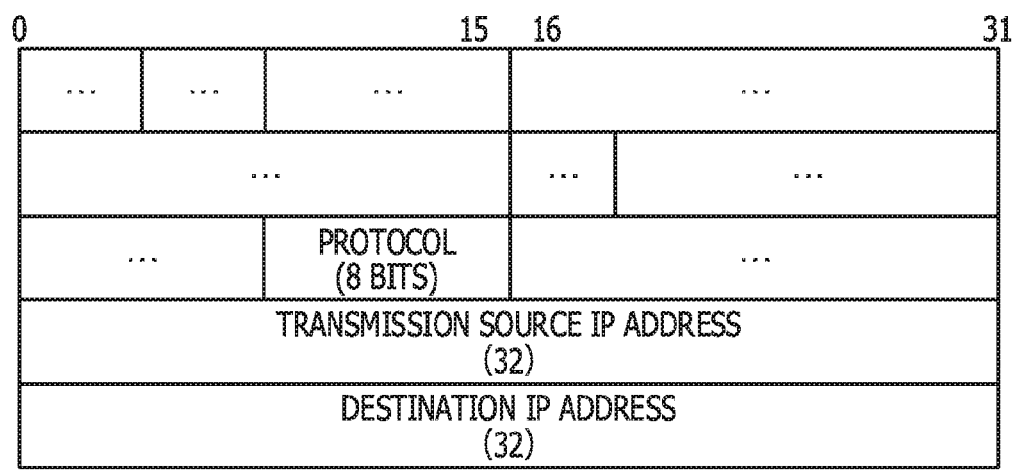
FIG. 7 is a diagram illustrating an IP header.

FIG. 7 is a diagram illustrating an IP header. As illustrated in FIG. 7, the IP header includes an eight-bit protocol, a 32-bit transmission source IP address, and a 32-bit destination IP address. The protocol represents a type of a network-protocol of a transport layer, which is an upper layer. If the protocol is 6, the packet is a TCP packet. The transmission source IP address is the IP address of the transmission source, and the destination IP address is the IP address of the destination.

The packet classification unit 12 identifies a connection by the combination of the transmission source IP address and the destination IP address of the IP header, and the transmission source port number and the destination port number of the TCP header, and classifies a TCP packet for each connection.

Figure 8:
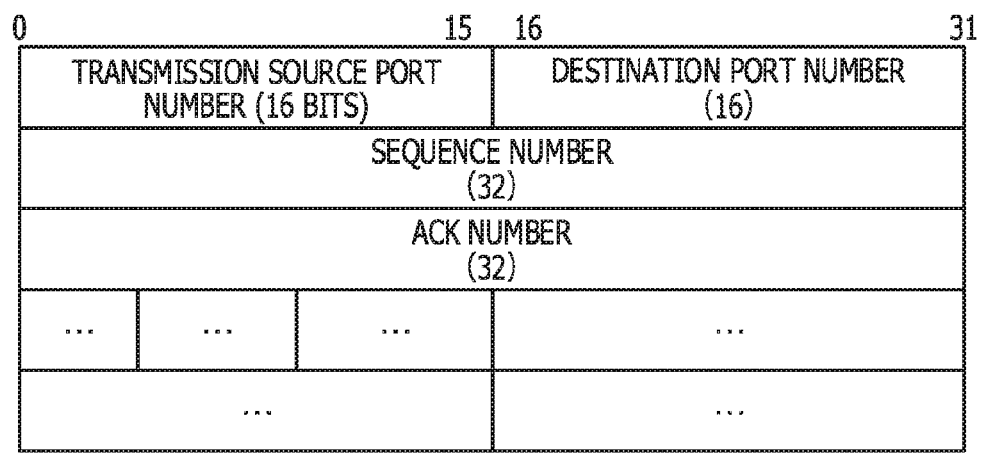
FIG. 8 is a diagram illustrating a TCP header.

FIG. 8 is a diagram illustrating a TCP header. As illustrated in FIG. 8, the TCP header includes a 16-bit transmission source port number, a 16-bit destination port number, a 32-bit sequence number, and a 32-bit ACK number. The transmission source port number is the port number of the transmission source, and the destination port number is the port number of the destination.

If the data size of the extracted TCP packet is not 0, the packet classification unit 12 determines that the TCP packet is a DATA packet and passes the TCP packet to the DATA packet processing unit 13. If the data size of the extracted TCP packet is 0, the packet classification unit 12 determines that the TCP packet is an ACK packet and passes the TCP packet to the ACK packet processing unit 14.

The DATA packet processing unit 13 processes the DATA packet. The DATA packet processing unit 13 includes a packet information recording unit 13a. The packet information recording unit 13a records the reception time, the transmission source IP address, the transmission source port number, the destination IP address, the destination port number, the sequence number, and the size of the DATA packet that has been passed from the packet classification unit 12 in the storage unit 15.

The ACK packet processing unit 14 processes the ACK packet. The ACK packet processing unit 14 includes a packet information recording unit 14a. The packet information recording unit 14a records the reception time, the transmission source IP address, the transmission source port number, the destination IP address, the destination port number, and the ACK number of the ACK packet passed from the packet classification unit 12 in the storage unit 15.

The storage unit 15 stores information on the DATA packet and the ACK packet. FIG. 9 is a diagram illustrating an example of the storage unit 15. As illustrated in FIG. 9, the storage unit 15 stores a reception time, a transmission source IP address, a transmission source port number, a destination IP address, a destination port number, a size, a sequence number, and an ACK number for each packet.

For example, the storage unit 15 receives a DATA packet at "2015-02-17 17: 42: 22. 065882", and the IP address and the port number of the transmission source of the DATA packet are "IP address A" and "port number A", respectively. The IP address and the port number of the destination of the DATA packet are "IP address B" and "port number B", respectively, the size is "500" (byte), and the sequence number is "1001".

Also, the storage unit 15, for example receives an ACK packet at "2015-02-17 17: 42: 22. 146981", and the IP address and the port number of the transmission source of the ACK packet are "IP address B" and "port number B", respectively. The IP address and the port number of the destination the ACK packet are "IP address A" and "port number A", respectively, and the ACK number is "1501".

When the ACK number of the received ACK packet matches the sequence number+the size of the recorded DATA packet, the RTT calculation unit 16 determines that the ACK packet is acknowledgment of the DATA packet. The RTT calculation unit 16 then calculates the difference between the reception time of the ACK packet and the reception time of the DATA packet as an RU.

The throughput calculation unit 17 identifies an RTT time section having the calculated RTT increasing in ascending order of ACK number for each connection, and calculates the maximum effective throughput of the time section by the data quantity transmitted in the identified time section and the time period of the time section.

Specifically, the throughput calculation unit 17 considers an RU group having an RTT increasing in ascending order of ACK number, not including a time out value of a delayed ACK, and having the RTT difference of less than 500 ms to be one measurement group whose throughput is measured. If a time out value of a delayed ACK is included, that is the case including a delay at the terminal 3, and thus the case is excluded from the measurement group. If the RTT difference is not less than 500 ms (millisecond), that is the case where the RTT has increased abruptly. Accordingly, there is a possibility of reconnection of the terminal 3, and thus the case is excluded from the measurement group.

Also, if the number of RTTs included the measurement group is less than five, the precision is deteriorated, and thus the throughput calculation unit 17 does not measure throughput. Also, if the ACK intervals are all less than 1 ms, the ACK intervals are too narrow, and thus there is a possibility that ACKs are transmitted together for some reason (the DATA intervals are not reproduced, and thus throughput to be measured originally might not be able to be measured). Accordingly, the throughput calculation unit 17 does not measure throughput.

Figure 10:
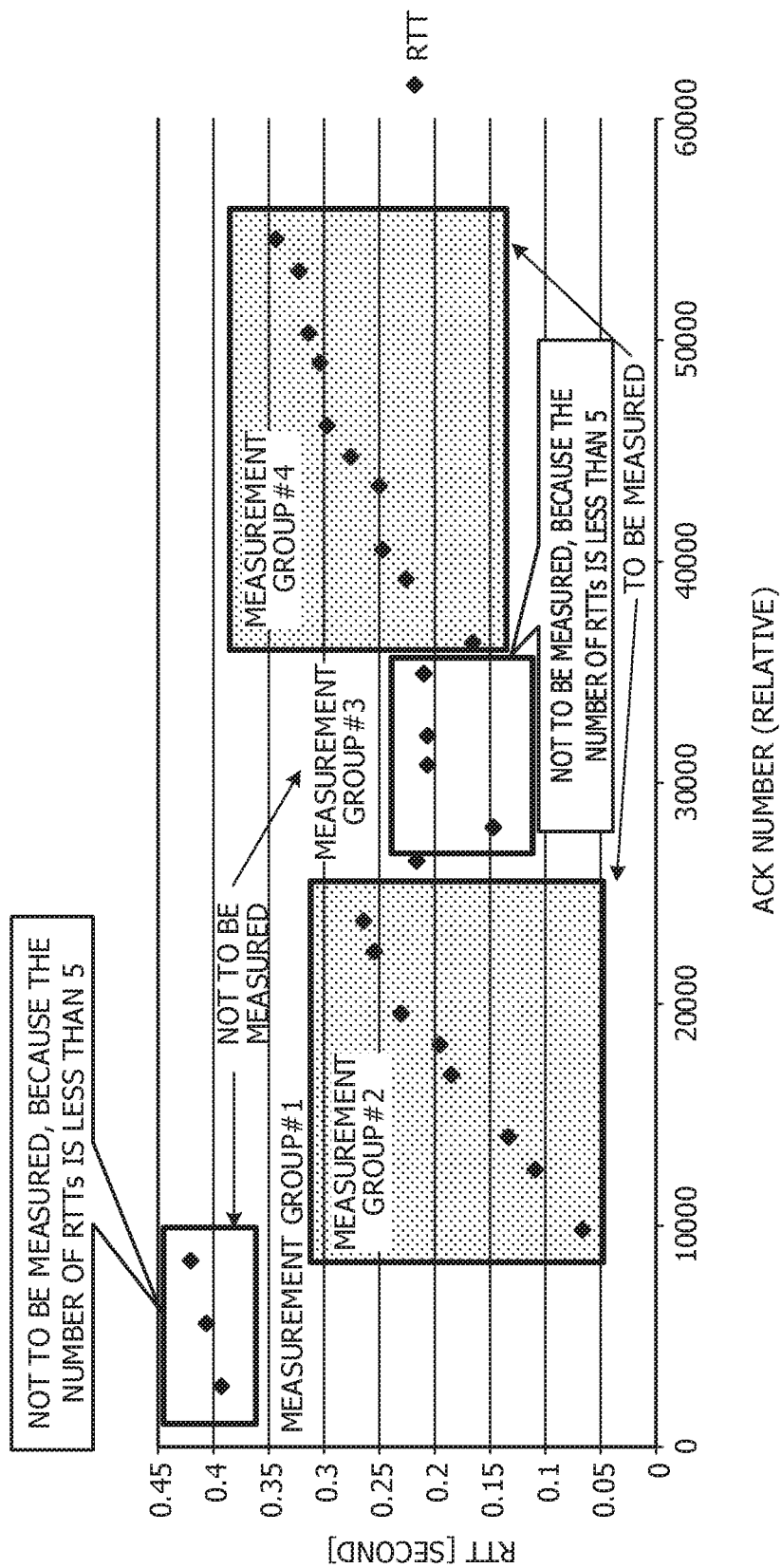
FIG. 10 is a diagram for explaining measurement groups.

FIG. 10 is a diagram for explaining the measurement groups. In FIG. 10, the horizontal axis represents relative ACK number, and the vertical axis represents RTT. In each measurement group, the RTT increases in ascending order of ACK number, and the RTT difference is less than 500 ms. However, in measurement group#1 and measurement group#3, five or more RTTs are not included. Accordingly, the throughput calculation unit 17 measures throughput in measurement group#2 and measurement group #4, but do not measure throughput in measurement group#1 and measurement group#3.

The display control unit 18 displays information on the maximum effective throughput calculated by the throughput calculation unit 17 in various forms in accordance with a user instruction. For example, as illustrated in FIG. 11, the display control unit 18 updates the calculated maximum effective throughput every minute. In this regard, in the description so far, the description has been given of the case of transmitting data from the server 1 to the terminal 3. However, in general, communication is performed bi-directionally, and thus it is possible to measure the maximum effective throughput in the two directions in the same manner. Accordingly, in FIG. 11, the maximum effective throughputs in the two directions, uplink and downlink, are displayed. Each row represents the maximum effective throughput for each communication. Here, "for each communication" may be for each connection, or for each session. As an example of "for each connection", a combination of "client IP address and port number" and "server IP address and port number" is provided. As an example of "for each session", a combination of "client IP address" and "server IP address and port number" is provided. Also, the values in each row are updated every minute.

Figure 12:
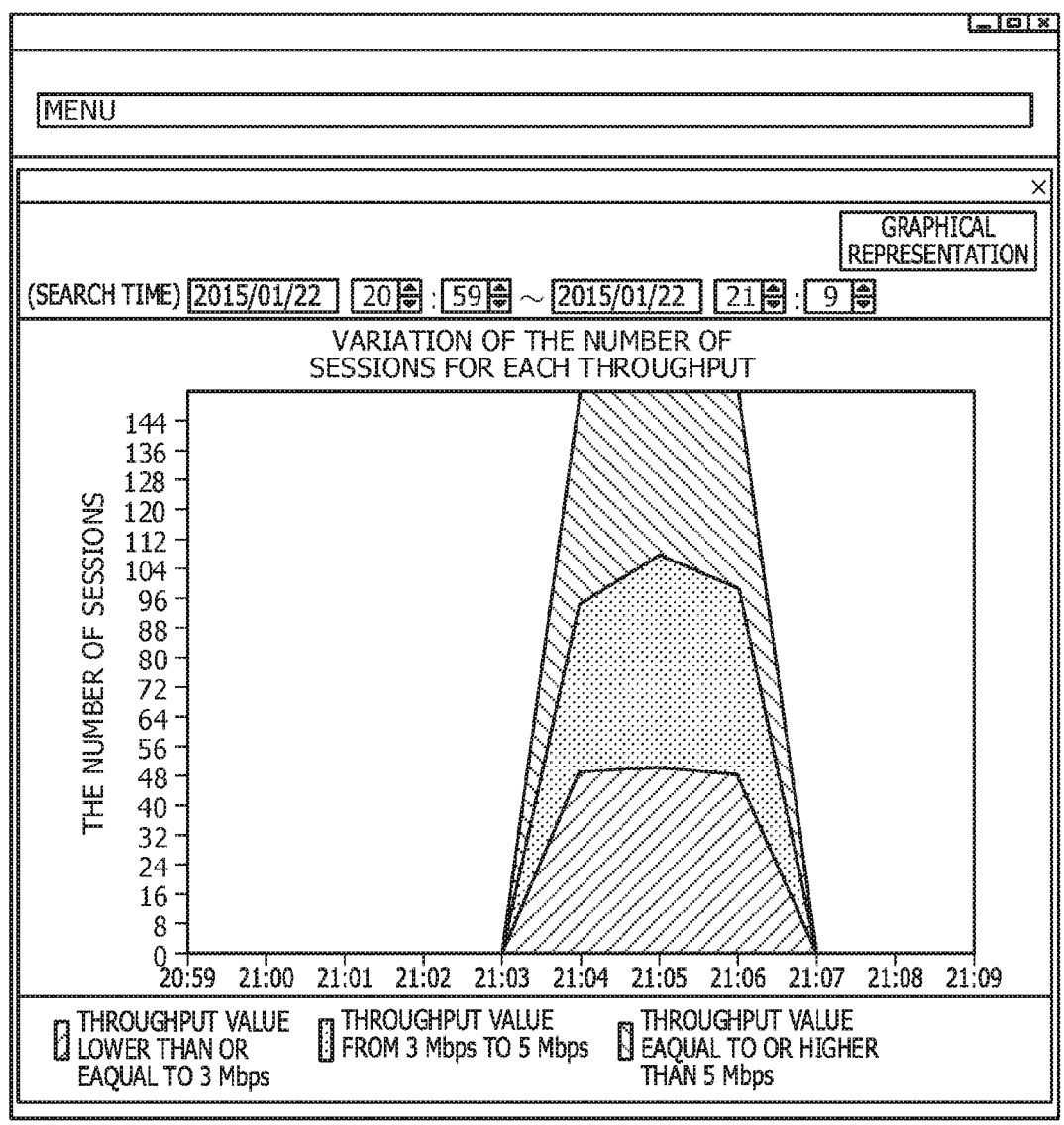
FIG. 12 is a diagram illustrating display example#2.

Also, as illustrated in FIG. 12, the display control unit 18 graphically displays the time variation of the number of sessions for each value range of the maximum effective throughput. In FIG. 12, the horizontal axis represents time, and the vertical axis represents the number of sessions. In FIG. 12, the numbers of sessions are displayed in the three ranges, that is to say, the maximum effective throughputs of lower than or equal to 3 Mbps, from 3 Mbps to 5 Mbps, and equal to or higher than 5 Mbps.

Figure 13:
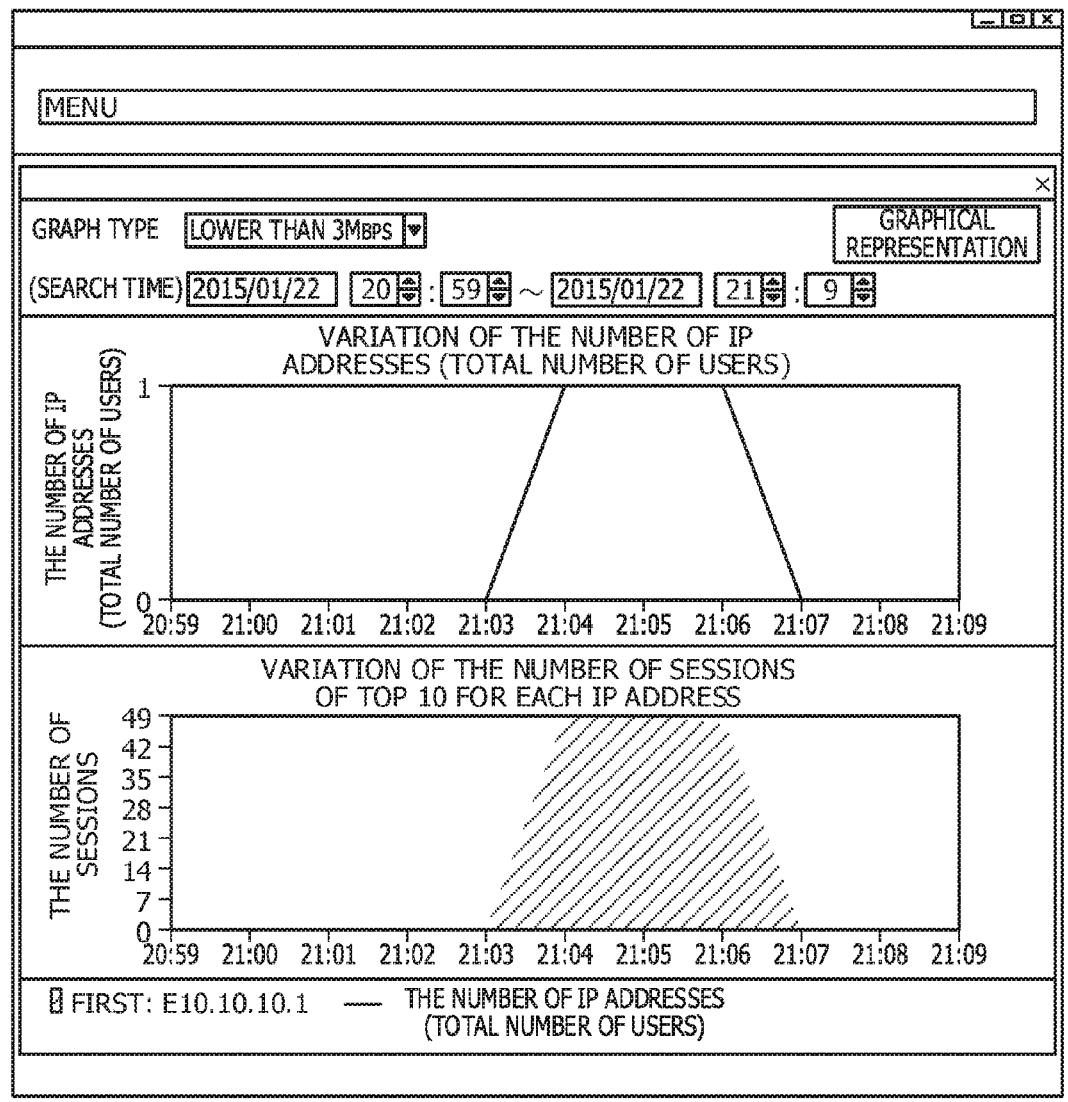
FIG. 13 is a diagram illustrating display example#3.

Also, as illustrated in FIG. 13, the display control unit 18 graphically displays the variation of the number of IP addresses with respect to a value range of the maximum effective throughput selected by a user in the upper graph, and graphically displays top 10 in descending order of the number of sessions for each IP address. The number of IP addresses represents the total number of users. In FIG. 13, the horizontal axis represents time, and the vertical axis represents the number of IP addresses in the upper graph, and represents the number of sessions in the lower graph. In FIG. 13, the variation of the number of IP addresses and the variation of the number of sessions are displayed with respect to the maximum effective throughput less than 3 Mbps. In this regard, in the lower graph in FIG. 13, the case where there is only the first IP address is displayed as top 10. Also, the graphs illustrated in FIG. 13 are updated every minute.

Figure 14:
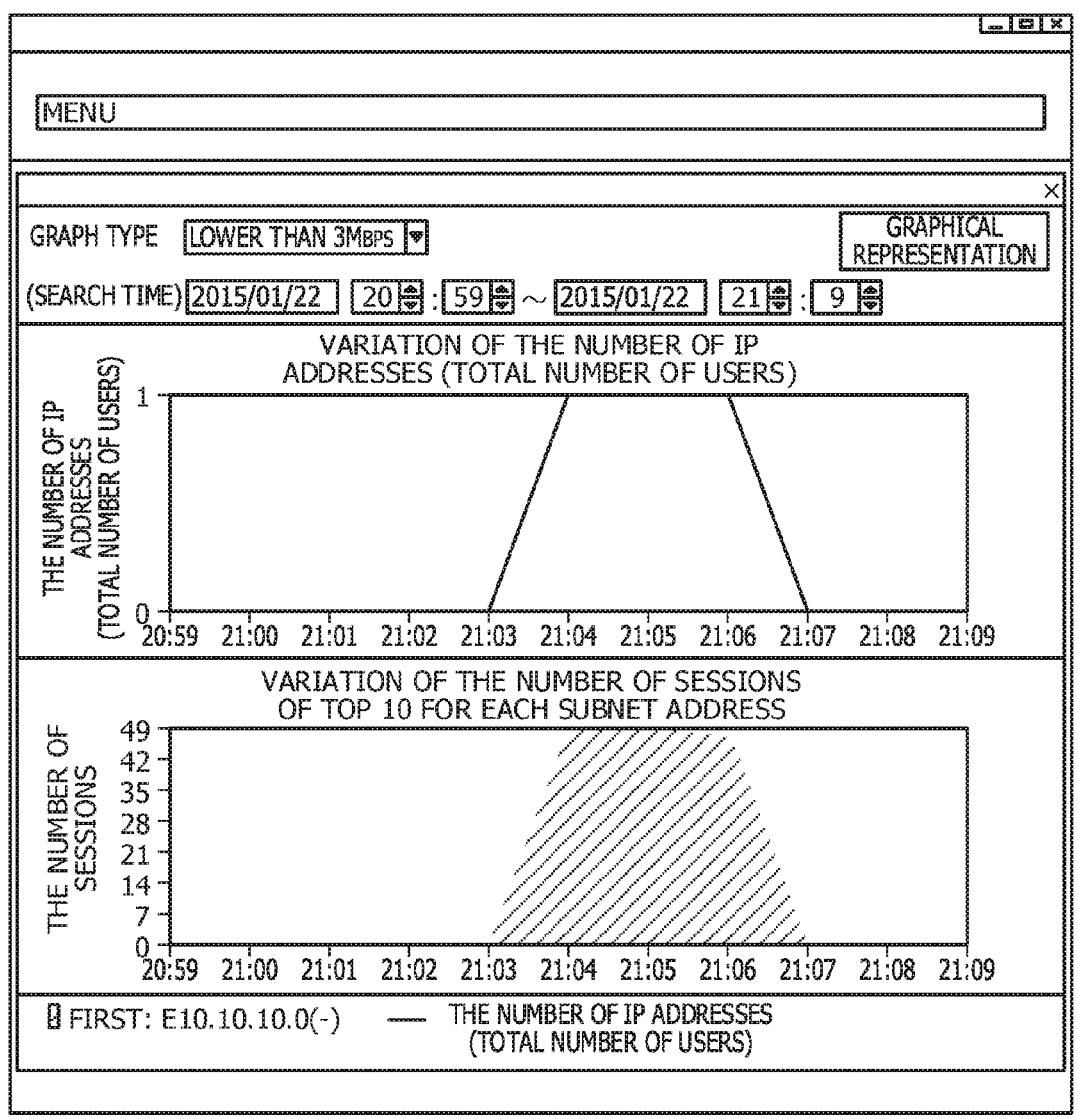
FIG. 14 is a diagram illustrating display example#4.

Also, as illustrated in FIG. 14, the display control unit 18 graphically displays the variation of the number of IP addresses with respect to the value range of the maximum effective throughput selected by the user in the upper graph, and displays top 10 in descending order of the number of sessions for each subnet address in the lower graph. In FIG. 14, the horizontal axis represents time, and the vertical axis represents the number of IP addresses in the upper graph, and represents the number of sessions in the lower graph. In FIG. 14, the variation of the number of IP addresses and the variation of the number of sessions are displayed with respect to the maximum effective throughput less than 3 Mbps. In this regard, in the lower graph in FIG. 14, the case where there is only the first subnet address is displayed as top 10. Also, the graphs illustrated in FIG. 14 are updated every minute.

Also, as illustrated in FIG. 15, the display control unit 18 graphically displays the variations of the maximum effective throughput and the effective throughput for each TCP connection, for each IP address, or for each subnet address. In FIG. 15, the horizontal axis represents time, and the vertical axis represents throughput. In FIG. 15, three cases are displayed, that is to say, case (1) in which the free bandwidth is narrow and the effective throughput is low, case (2) in which the free bandwidth is wide and the effective throughput is high, and case (3) in which the free bandwidth is wide, but the effective throughput is low.

Figure 16:
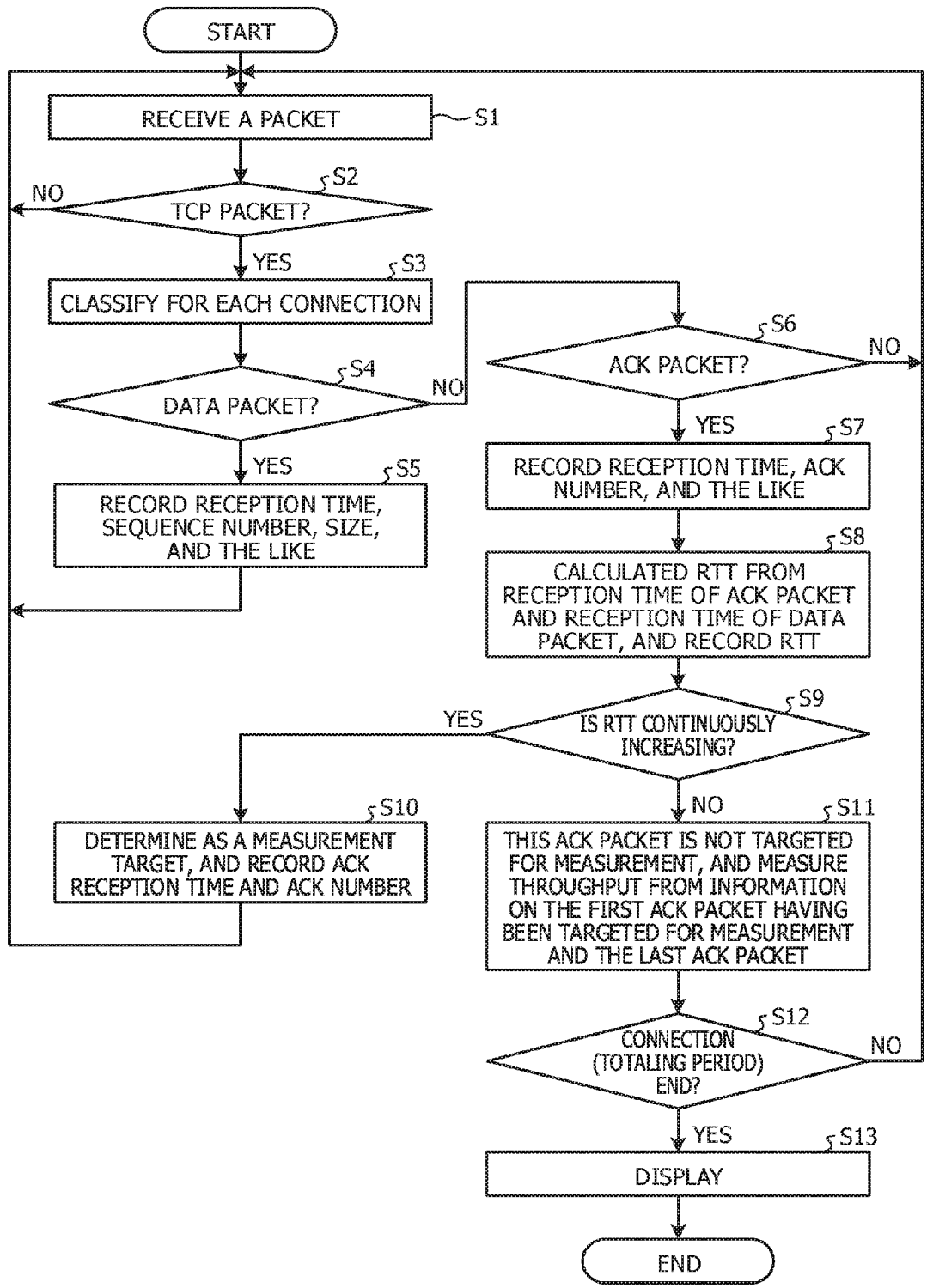
FIG. 16 is a flowchart illustrating a flow of the processing performed by the throughput measuring apparatus.

Next, a description will be given of a flow of processing by the throughput measuring apparatus 10. FIG. 16 is a flowchart illustrating a flow of the processing performed by the throughput measuring apparatus 10. Note that, in the processing in FIG. 16, it is assumed that the measurement conditions other than the condition that the RTT is continuously increasing are satisfied.

As illustrated in FIG. 16, the throughput measuring apparatus 10 receives a packet (S1). The throughput measuring apparatus 10 then determines whether or not the received packet is a TCP packet (S2). If the received packet is not a TCP packet, the processing returns to S1.

On the other hand, if the received packet is a TCP packet, the packet classification unit 12 classifies the TCP packet for each connection (S3). The packet classification unit 12 then determines whether or not the TCP packet is a DATA packet (S4). If the TCP packet is a DATA packet, the DATA packet processing unit 13 records the reception time, the sequence number, the size, and the like in the storage unit 15 (S5). The processing of the throughput measuring apparatus 10 then returns to S1.

On the other hand, if the TCP packet is not a DATA packet, the packet classification unit 12 determines whether or not the TCP packet is an ACK packet (S6). If the TCP packet is not an ACK packet, the processing of the throughput measuring apparatus 10 returns to S1. On the other hand, if the TCP packet is an ACK packet, the ACK packet processing unit 14 records the reception time, the ACK number, and the like in the storage unit 15 (S7).

The RTT calculation unit 16 then calculates an RTT from the reception time of the ACK packet and the reception time of the DATA packet (S8). The RTT calculation unit 16 then determines whether or not the RTT is continuously increasing (S9). If the RTT is continuously increasing, the RTT calculation unit 16 determines the RTT to be a measurement target, and records the ACK reception time and the ACK number (S10). The processing of the throughput measuring apparatus 10 then returns to S1.

On the other hand, if the RTT is not continuously increasing, the throughput calculation unit 17 does not regard this ACK packet as a measurement target, and measures throughput from information of the first ACK packet to be measured and the last ACK packet (S11).

The throughput measuring apparatus 10 then determines whether or not a connection, that is to say a totaling period, has been completed (S12). If not completed, the processing returns to S1. On the other hand, if completed, the display control unit 18 displays the maximum effective throughput on the display device based on the user's instruction (S13).

In this manner, the throughput measuring apparatus 10 measures throughput in a time section in which the RTT is continuously increasing so that it is possible to measure the maximum effective throughput.

As described above, in the embodiment, the packet classification unit 12 extracts a TCP packet from the packet received by the reception unit 11, passes a DATA packet to the DATA packet processing unit 13, and passes an ACK packet to the ACK packet processing unit 14. The DATA packet processing unit 13 then records information on the DATA packet, such as the reception time, and the like in the storage unit 15. The ACK packet processing unit 14 records the information on the ACK packet, such as the reception time, the ACK number, and the like in the storage unit 15. The RTT calculation unit 16 then calculates an RTT based on the information in the storage unit 15. The throughput calculation unit 17 identifies a time section in which the RTT is increasing in ascending order of ACK number, and calculates throughput of the identified time section. Accordingly, it is possible for the throughput measuring apparatus 10 to calculate the maximum effective throughput.

Also, in the embodiment, the throughput calculation unit 17 considers a time section not including a time out value of a delayed ACK to be a time section whose throughput is to be calculated. Accordingly, it is possible for the throughput measuring apparatus 10 to correctly calculate throughput by excluding the case of including a delay in the terminal 3.

Also, in the embodiment, the throughput calculation unit 17 considers an RTT group having the RTT difference of less than 500 ms to be one measurement group whose throughput is to be measured. Accordingly, it is possible for the throughput measuring apparatus 10 to correctly calculate throughput by excluding the case having a possibility of reconnection of the terminal 3.

Also, in the embodiment, the throughput calculation unit 17 does not calculate a throughput in the case where the number of RTTs included in the measurement group is less than five. Accordingly, it is possible for the throughput measuring apparatus 10 to correctly calculate throughput by excluding the case having poor precision.

Also, in the embodiment, the throughput calculation unit 17 does not measure a throughput if the ACK intervals are all less than 1 ms. Accordingly, it is possible for the throughput measuring apparatus 10 to correctly calculate throughput by excluding the case of having a possibility that ACKs are transmitted together for some reason (the DATA intervals are not reproduced, and thus there is a possibility that throughput to be originally measured fails to be measured).

Also, in the embodiment, the display control unit 18 graphically displays the time variation of the number of sessions for each value range of the maximum effective throughput. Accordingly, it is possible for the throughput measuring apparatus 10 to support the user's decision on the determination of whether or not a network analysis, an increase in the communication bandwidth, or the like is indispensable.

Also, in the embodiment, the display control unit 18 graphically displays the variation of the number of IP addresses with respect to a value range of the maximum effective throughput selected by a user. Accordingly, it is possible for the throughput measuring apparatus 10 to support the user's decision on the determination of whether or not a network analysis, an increase in the communication bandwidth, or the like is indispensable.

Also, in the embodiment, the display control unit 18 displays the maximum effective throughput and the effective throughput in an arranged manner. Accordingly, it is possible for the throughput measuring apparatus 10 to support the user's decision on the determination of whether or not a network analysis, an increase in the communication bandwidth, or the like is indispensable.

In this regard, in the embodiment, a description has been given of the throughput measuring apparatus 10. However, it is possible to achieve the configuration of the throughput measuring apparatus 10 by software so as to obtain a throughput measuring program having the same function. Thus, a description will be given of a computer that executes the throughput measuring program.

Figure 17:
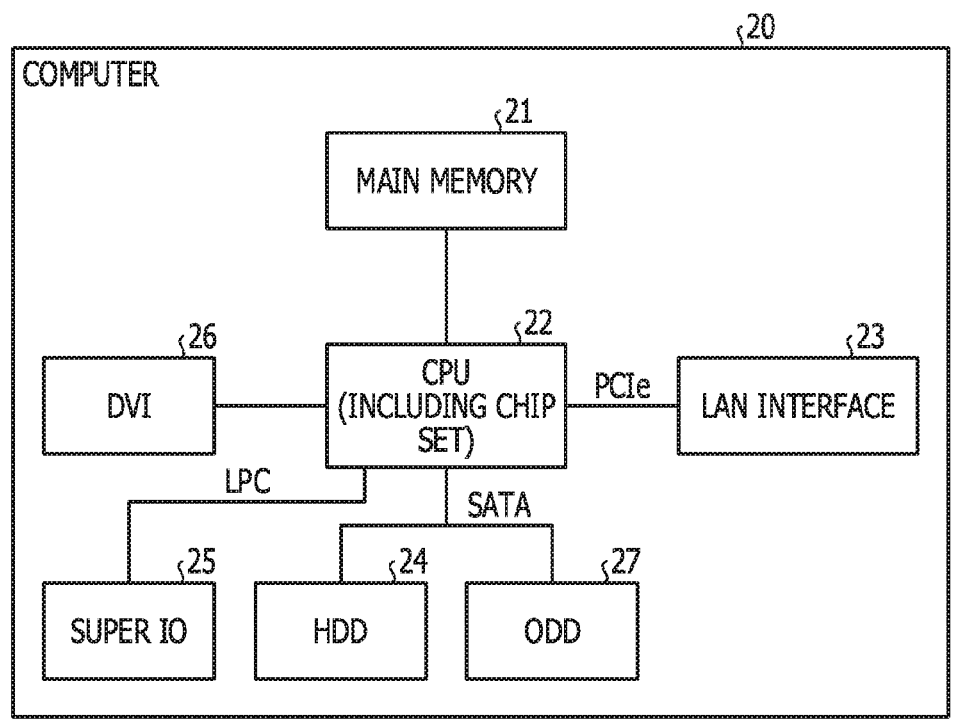
FIG. 17 is a diagram illustrating a hardware configuration of a computer that executes a throughput measuring program according to an embodiment.
Figure 18:
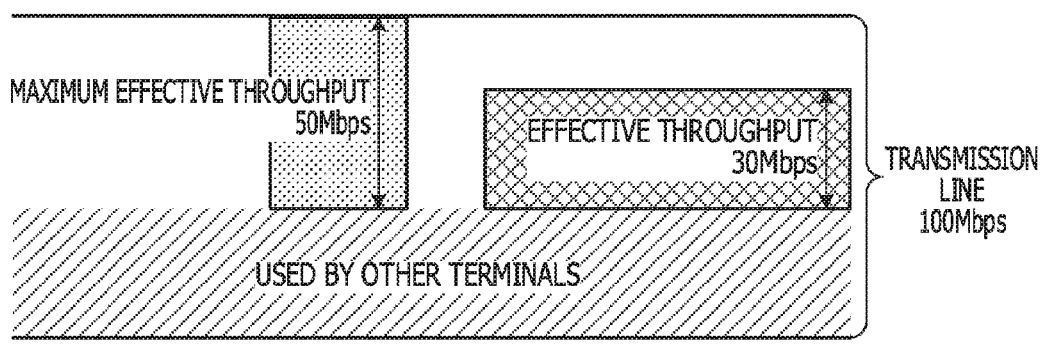
FIG. 18 is a diagram for explaining throughput.

FIG. 17 is a diagram illustrating a hardware configuration of a computer that executes the throughput measuring program according to the embodiment. As illustrated in FIG. 17, a computer 20 includes a main memory 21, a central processing unit (CPU) 22, a local area network (LAN) interface 23, and a hard disk drive (HDD) 24. Also, the computer 20 includes a Super Input Output (IO) 25, a Digital Visual Interface (DVI) 26, and an optical disc drive (ODD) 27.

The main memory 21 is a memory that stores programs and an execution intermediate result, and the like. The CPU 22 is a central processing unit that reads the programs from the main memory 21, and executes the programs. The CPU 22 includes a chip set including a memory controller.

The LAN interface 23 is an interface for coupling the computer 20 to the other computers via a LAN. The HDD 24 is a disk device that stores programs and data, the Super IO 25 is an interface for coupling an input device, such as a mouse, a keyboard, or the like. The DVI 26 is an interface for coupling a display device, and the ODD 27 is a device for reading and writing on a DVD.

The LAN interface 23 is coupled to the CPU 22 by PCI Express (PCIe), and the HDD 24 and the ODD 27 are coupled to the CPU 22 by Serial Advanced Technology Attachment (SATA). The Super IO 25 is coupled to the CPU 22 by Low Pin Count (LPC).

The throughput measuring program to be executed on the computer 20 is stored on a DVD, is read from the DVD by the ODD 27 and is installed in the computer 20. Alternatively, the throughput measuring program is stored in a database of another computer system, or the like that is coupled via the LAN interface 23, is read from the database and is installed in the computer 20. The installed throughput measuring program is then stored on the HDD 24 and is read into the main memory 21 to be executed by the CPU 22.

Also, in the embodiment, a description has been given of the case where the throughput measuring apparatus 10 captures packets in order to calculate the maximum effective throughput. However, the present disclosure is not limited to this. It is possible to apply the present disclosure to the case where information on the captured packets is once stored in a file or the like, and the information is read from the file or the like in order to calculate the maximum effective throughput in the same manner.

Also, in the embodiment, the description has been given of the case where a wireless section is a bottleneck section. However, the present disclosure is not limited to this, and it is possible to apply the present disclosure to the case where a wired section is a bottleneck section in the same manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A throughput measuring method to measure throughput of a network through which a transmission source apparatus transmits data packets, a transmission destination apparatus receives the transmitted data packets, and the transmission source apparatus receives response packets transmitted in response to the transmitted data packets, respectively, and each of the response packets includes an identification number indicating an order of the response packet with respect to the other response packets with a difference in identification numbers between response packets representing a number of bytes of transmitted data, the method comprising:
by at least one processor,
acquiring the data packets and the response packets at an observation point on the network between the transmission source apparatus and the transmission destination apparatus;
calculating, for each of the acquired data packets and using the acquired response packets, a round trip time indicating a period from a time when the transmission source apparatus transmitted the data packet to a time when the transmission source apparatus received the response packet transmitted in response to the data packet, to thereby provide calculated round trip times;
identifying a measurement time section by extracting, from among the calculated round trip times, target round trip times increasing in ascending order of the identification numbers of the response packets; and
calculating a throughput of the identified measurement time section using data quantities of target data packets transmitted from the transmission source apparatus during the identified measurement time section, among the data packets, to thereby provide a calculated throughput.

2. The throughput measuring method according to claim 1, further comprising:
identifying the measurement time section by specifying a time section not including a response packet having the round trip time including a delay at the transmission destination apparatus.

3. The throughput measuring method according to claim 1, further comprising:
identifying the measurement time section by specifying a time section not including a response packet having a difference in the round trip time larger than a predetermined threshold time.

4. The throughput measuring method according to claim 1, further comprising:
identifying the measurement time section by specifying a time section including the number of response packets having the round trip time increasing in order of acquisition higher than a predetermined threshold number.

5. The throughput measuring method according to claim 1, further comprising:
identifying the measurement time section by excluding a time section with which all of included time intervals of acquiring the response packets are shorter than a predetermined interval time.

6. The throughput measuring method according to claim 1, further comprising:
displaying time variation of the number of sessions for each numeric value range of throughputs based on information on calculated throughputs.

7. The throughput measuring method according to claim 1, further comprising:
displaying time variation of the number of IP addresses for each numeric value range of throughputs based on information on calculated throughputs.

8. The throughput measuring method according to claim 1, further comprising:
displaying information of the calculated throughput and information on a throughput calculated by another method in an arranged manner.

9. A non-transitory computer readable medium having stored therein a program that causes a computer to execute a process to measure throughput of a network through which a transmission source apparatus transmits data packets, a transmission destination apparatus receives the transmitted data packets, and the transmission source apparatus receives response packets transmitted in response to the transmitted data packets, respectively, and each of the response packets includes an identification number indicating an order of the response packet with respect to the other response packets with a difference in identification numbers between response packets representing a number of bytes of transmitted data, the process comprising:
acquiring the data packets and the response packets at an observation point on the network between the transmission source apparatus and the transmission destination apparatus;
calculating for each of the acquired data packets and using the acquired response packets, a round trip time indicating a period from a time when the transmission source apparatus transmitted the data packet to a time when the transmission source apparatus received the response packet transmitted in response to the data packet, to thereby provide calculated round trip times;

identifying a measurement time section by extracting, from among the calculated round trip times, target round trip times increasing in ascending order of the identification numbers of the response packets; and calculating a throughput of the identified measurement time section using data quantities of target data packets transmitted from the transmission source apparatus during the identified measurement time section, among the data packets, to thereby provide a calculated throughput.

10. The non-transitory computer readable medium according to claim 9, wherein the process further comprising:

identifying the measurement time section by specifying a time section not including a response packet having the round trip time including a delay at the transmission destination apparatus.

11. The non-transitory computer readable medium according to claim 9, wherein the process further comprising:

identifying the measurement time section by specifying a time section not including a response packet having a difference in the round trip time larger than a predetermined threshold time.

12. The non-transitory computer readable medium according to claim 9, wherein the process further comprising:

identifying the measurement time section by specifying a time section including the number of response packets having the round trip time increasing in order of acquisition higher than a predetermined threshold number.

13. The non-transitory computer readable medium according to claim 9, wherein the process further comprising:

identifying the measurement time section by excluding a time section with which all of included time intervals of acquiring the response packets are shorter than a predetermined interval time.

14. The non-transitory computer readable medium according to claim 9, wherein the process further comprising:

displaying time variation of the number of sessions for each numeric value range of the throughputs based on information on calculated throughputs.

15. The non-transitory computer readable medium according to claim 9, wherein the process further comprising:

displaying time variation of the number of IP addresses for each numeric value range of throughputs based on information on calculated throughputs.

16. The non-transitory computer readable medium according to claim 9, wherein the process further comprising:

displaying information of the calculated throughput and information on a throughput calculated by another method in an arranged manner.

17. An apparatus configured to measure throughput of a network through which a transmission source apparatus transmits data packets, a transmission destination apparatus receives the transmitted data packets, and the transmission source apparatus receives response packets transmitted in response to the transmitted data packets, respectively, and each of the response packets includes an identification number indicating an order of the response packet with respect to the other response packets with a difference in identification numbers between response packets representing a number of bytes of transmitted data, the apparatus comprising:

a memory; and a processor coupled to the memory and configured to:

acquire the data packets and the response packets at an observation point on the network between the transmission source apparatus and the transmission destination apparatus;

calculate for each of the acquired data packets and using the acquired response packets, a round trip time indicating a period from a time when the transmission source apparatus transmitted the data packet to a time when the transmission source apparatus received the response packet transmitted in response to the data packet, to thereby provide calculated round trip times;

identify a measurement time section by extracting, from among the calculated round trip times, target round trip times increasing in ascending order of the identification numbers of the response packets; and calculate a throughput of the identified measurement time section using data quantities of target data packets transmitted from the transmission source apparatus during the identified measurement time section, among the data packets, to thereby provide a calculated throughput.

* * * * *